UNITED STATES PATENT OFFICE.

ALEXANDER L. STRAUS, OF BALTIMORE, MARYLAND, ASSIGNOR TO BALTIMORE PROCESS COMPANY, OF BALTIMORE, MARYLAND, A CORPORATION OF DELAWARE.

NON-ALCOHOLIC BEVERAGE AND PROCESS OF PRODUCING THE SAME.

1,265,275.  Specification of Letters Patent.  Patented May 7, 1918.

No Drawing.  Application filed October 15, 1917. Serial No. 196,723.

*To all whom it may concern:*

Be it known that I, ALEXANDER L. STRAUS, a citizen of the United States, residing at Baltimore, in the State of Maryland, have invented certain new and useful Improvements in Non-Alcoholic Beverages and Processes of Producing the Same; and I do hereby declare the following to be a full, clear, and exact description of the invention, such as will enable others skilled in the art to which it appertains to make and use the same.

This invention relates to a non-alcoholic, non-malt containing beverage and process of producing the same and has for its object to provide a process and product which is superior to those heretofore proposed.

With this and other objects in view the invention consists in the novel steps and combinations of steps constituting the process and in the novel beverage constituting the product all as will be more fully hereinafter disclosed and particularly pointed out in the claims.

In carrying out this process I may take say 50 barrels of boiling water, add thereto 1400 pounds of glucose, preferably of a highly dextrined quality, and after boiling the mixture for say half an hour, I may add about 30 pounds of hops; ten minutes later, I may add say 25 pounds of gum arabic, or other foam producing material, and after another ten minutes I may add say about 5 pints of any well known and suitable sugar coloring material.

The mixture may now be boiled for about an hour, making the total boiling operation about one and one half hours. I next determine the proportions of the mixture that has boiled off, and add sufficient boiling water to replace that evaporated so as to bring the total number of barrels back to the number originally had.

After the boiling operation is completed, the mixture may be passed through the hop-jack to strain off the hop residue, and then through a cooler preferably of the well known Baudelot type, where it is cooled to say 8¾° C. From the Baudelot cooler the liquid is passed to the settling or fermenting tank, and about ¾ pound of yeast to each barrel is added. Fermentation is now permitted to proceed in the usual manner except it is preferred to carry it out at say 11° R. The fermenting liquid is next passed to the storage vats where fining material is added as usual and the beer stored for say four weeks when it will be found to be clear enough for filtering. The liquid is now filtered as usual and if also carbonated in the usual manner, it will be found ready for use, as an alcoholic beverage.

On the other hand, when it is desired to produce a non-alcoholic beverage, I omit the carbonating step just described, and pass the beer into a brewer's kettle or other suitable container, where all or substantially all of its alcohol is evaporated in a manner similar to that disclosed in my U. S. Patent No. 1,223,121, dated April 17, 1917, entitled Process for making a non-alcoholic beverage, and in my U. S. Reissue Patent No. 14,391, dated Nov. 6, 1917, entitled Process for making a non-alcoholic beverage.

After the alcohol has been removed from the beer I next proceed as disclosed in the above mentioned patents to add ingredients as follows:—

Supposing that the alcohol is eliminated by a second boiling operation, I add to the boiled product a quantity of hot water equal to the quantity evaporated, during the elimination of the alcohol. When the said second boiling operation is nearing its close I add to each ten barrels about one pound of salt, and a half hour before the completion of said second boiling operation I add one fifth of a pound of hops and about two ounces of gum arabic, or other suitable foam producing material per barrel of the boiling beverage.

I next add about one and three-fourths pounds of granulated sugar, or other sweetening material per barrel, and say ten minutes before the second boiling operation is completed I add about three pounds of concentrated hops.

The temperature of the beverage is now rapidly reduced to approximately four degrees centigrade, preferably by running it through a Baudelot cooler. I next add to the beverage while being cooled one-half an ounce per barrel of liquid quassia, or other material adapted to impart a bitter pungent taste. This liquid quassia is conveniently produced by taking one ounce of commercial quassia and boiling it in sufficient water to produce sixteen ounces of liquor, or liquid quassia. From the cooler the beverage is run into chip casks, where I add finings in the usual manner, and also a suitable chill proofing material, preferably the well known "caluperline" of commerce. I also add a suitable preservative compound, preferably in the form of four commercial sized meta-bisulfite of potassium tablets per barrel. After the beverage product has been in storage from say two to five days it is filtered and carbonated, when it is ready for the market.

Non-alcoholic beer made as above outlined will be found to so closely resemble the alcoholic variety as to appearance, and taste as to make it difficult to distinguish the one from the other except as regards the stimulation offered by the latter.

It is obvious that those skilled in the art may vary the details of the process and product without departing from the spirit of the invention and therefore, I do not wish to be limited to the above disclosure except as may be required by the claims.

What I claim is:—

1. The steps in the process of making a non-alcoholic, non-malt containing beverage from a liquor containing alcohol and derived from fermented glucose, which consist in eliminating from said liquor substantially all the alcohol present; and partially restoring the original taste of said liquor by adding to the product thus obtained suitable quantities of salt, a sweetening material, and hops, substantially as described.

2. The steps in the process of making a non-alcoholic, non-malt containing beverage which consist in producing a fermented alcohol-containing liquor from glucose and other materials; eliminating substantially all the alcohol present; and partially restoring the original taste by adding suitable quantities of water, salt, sweetening material and hops, substantially as described.

3. The steps in the process of making a non-alcoholic, non-malt containing beverage which consist in producing a fermented alcohol-containing liquor from a dextrined quality of glucose, and other materials; eliminating substantially all the alcohol present; and partially restoring the original taste by adding suitable quantities of water, salt, sweetening material, a material capable of imparting a bitter taste, and hops, substantially as described.

4. The steps in the process of making a non-alcoholic, non-malt containing beverage which consist in producing a fermented alcohol-containing liquor from a highly dextrined quality of glucose, and other materials; eliminating substantially all the alcohol present; and partially restoring the original taste by adding suitable quantities of water, salt, sugar, quassia, hops, and a foam producing material, substantially as described.

5. The steps in the process of making a non-alcoholic, non-malt containing beverage which consist in producing a fermented alcohol-containing liquor from a highly dextrined quality of glucose, and other materials; eliminating substantially all the alcohol present; and partially restoring the original taste by adding suitable quantities of water, salt, sugar, quassia, hops, gum arabic, meta-bisulfite of potassium, and carbonic acid gas, substantially as described.

6. The herein described non-alcoholic, non-malt containing beverage comprising a fermented glucose base material from which substantially all the alcohol has been eliminated and containing water, salt, sugar and hops, substantially as described.

7. The herein described non-alcoholic, non-malt containing beverage comprising a fermented glucose beer from which substantially all the alcohol has been eliminated and containing water, salt, sugar, quassia and hops, substantially as described.

8. The herein described non-alcoholic, non-malt containing beverage comprising a fermented glucose beer from which substantially all the alcohol has been eliminated and containing water, salt, sugar, quassia, a foam producing material, a preserving material, a chill-proofing material and hops, substantially as described.

In testimony whereof I affix my signature, in presence of two witnesses.

ALEXANDER L. STRAUS.

Witnesses:
 MARY B. BOWEN,
 ANITA McNEILL.